Patented Feb. 26, 1929.

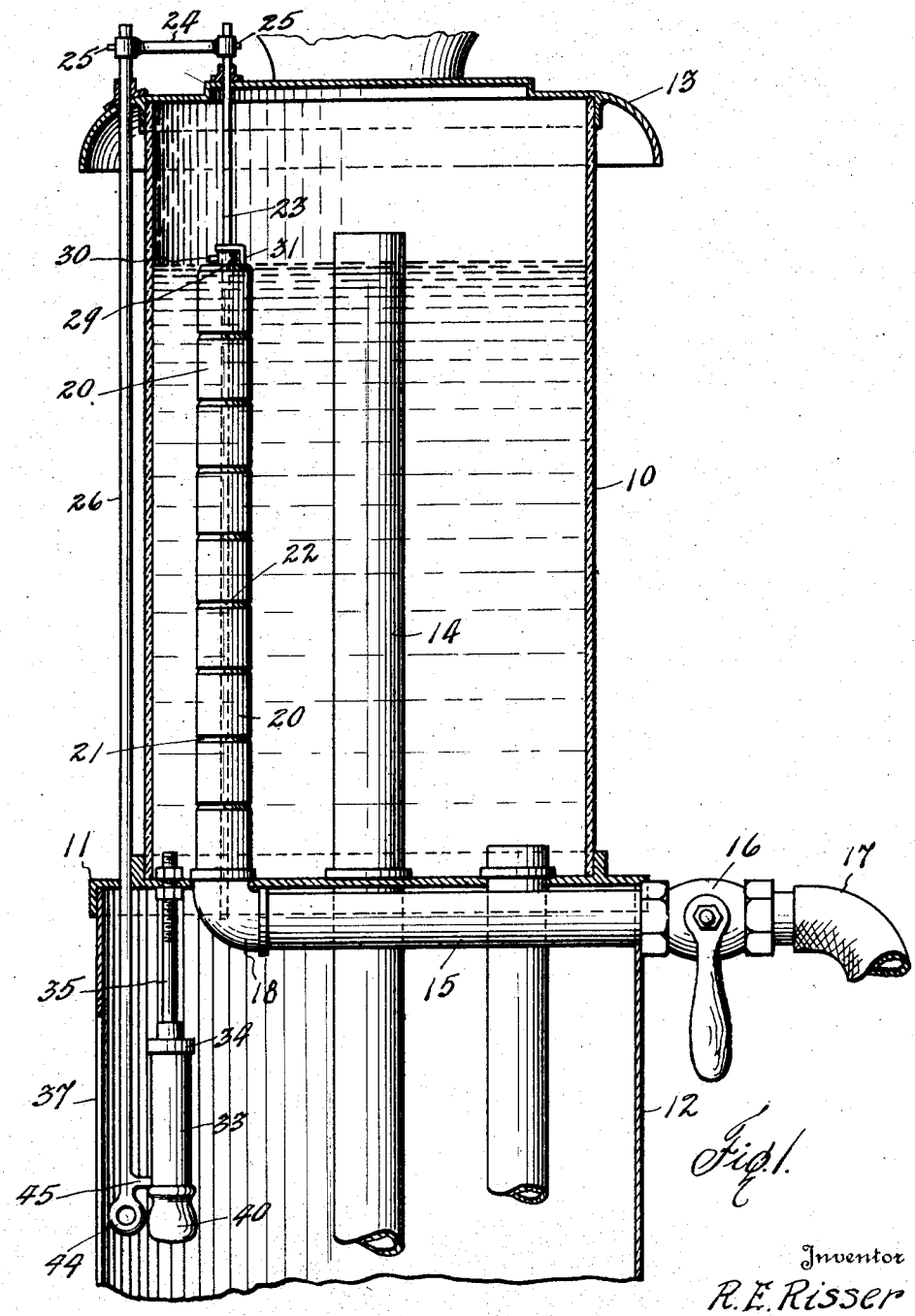

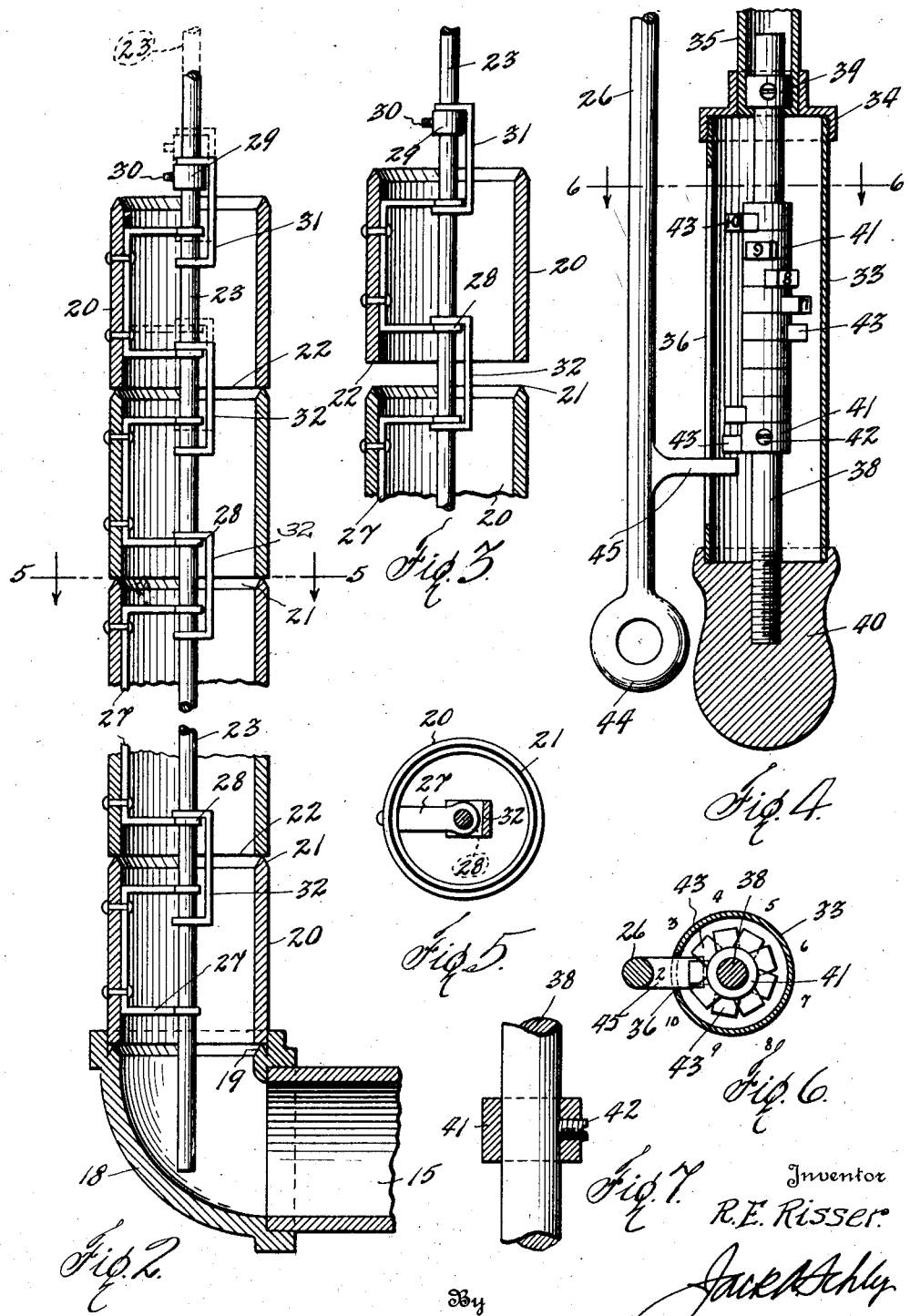

1,703,363

UNITED STATES PATENT OFFICE.

ROSS E. RISSER, OF BONHAM, TEXAS, ASSIGNOR TO CATRON MANUFACTURING COMPANY, OF BONHAM, TEXAS, A CORPORATION OF TEXAS.

VISIBLE UNIT-MEASURING LIQUID DISPENSER.

Application filed July 27, 1925. Serial No. 46,232.

This invention relates to new and useful improvements in visible unit-measuring liquid dispensers.

In dispensing liquid such as gasoline, which is sold by the gallon the present unit of measurement, it is customary to display the liquid in a glass measuring receptacle or container holding five or ten gallons. In order to dispense less than the capacity of the container, say two gallons, the operator must gage the liquid level by marks on the container. This is quite difficult as the container is located above the head of the operator.

Several patents have been granted showing means for dispensing the liquid from a visible container in units, but so far as I am aware all of these devices flow or deliver the liquid from the bottom of the container and involve more complicated structures than is proposed through my invention.

The object of my invention is to provide means for dispensing gasoline or other liquid from the top of the container and in successive equal quantities downward from said top.

A further object of the invention is to provide a series of measuring and conducting valves in the container together with manually operated visible means for opening the valves at the point to dispense the quantity desired.

Another object of the invention is to provide a conductor within the container for dispensing the fluid therefrom and arranged to be opened or disconnected at a predetermined level to drain from the tank a desired quantity of fluid.

A still further object of the invention is to provide a vertical conductor in the container arranged to be opened at regularly spaced levels to drain equal quantities of liquid between said levels.

An important object of the invention is to provide a unit measuring and dispensing conductor in the tank arranged to be operated from the top of the tank, thus avoiding packing boxes and other complications.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is a partial vertical sectional view of a dispenser constructed in accordance with my invention, Fig. 2 is a vertical sectional view of the measuring and dispensing column, the valves being closed, Fig. 3 is a detail showing the valves opened, Fig. 4 is a vertical sectional view of the setting and operating means, Fig. 5 is a cross-sectional view taken on the line 5—5 of Fig. 2, Fig. 6 is a cross-sectional view taken on the line 6—6 of Fig. 4, and Fig. 7 is a detail showing one of the adjustable setting collars.

In the drawings the numeral 10 designates a vertical glass cylinder which is suitably mounted on a flanged base 11, which is carried by a pedestal 12. A flanged cap 13 covers the top of the cylinder. An overflow pipe 14 extends down through the cylinder, base and pedestal. The upper end of the pipe 14 terminates at the upper level of the liquid capacity of the cylinder, so as to drain out all liquid above the measured capacity of the cylinder.

A dispensing pipe 15 extends horizontally under the base 11 and through the side of the pedestal. A dispensing valve 16 is mounted on the outer end of the pipe and a hose 17 is secured to the valve. An elbow 18 is fastened to the inner end of the pipe and extends up through the base 11 in which it is suitably fastened so that liquid will not leak therearound. The upper end of the elbow is formed with an annular seat 19 in the bottom of the glass cylinder.

The essence of the invention resides in a measuring valve column in the cylinder. This column consists of a plurality of cylindrical valves 20, the lowermost of which rests in the seat 19. In order to obtain an effective closure between the superimposed valves, the upper edge 31 of each valve has a double bevel, whereby it is reduced to a knife edge, but not a cutting edge. The bottom edge 22, of each valve which rests upon the edge 21, is cut horizontally across the valve so as to be flat and readily seat upon the edge 21. By this arrangement the chance of obstructions lodging between the valves is reduced to a minimum.

I have illustrated a glass cylinder for containing and dispensing ten gallons, which is the quantity in the cylinder when the liquid is level with the top of the overflow pipe 14. Nine valves 20 are shown and the liquid above said valves and in the column elbow 18, pipe 15 and valve 16 equal one gallon. Thus if the dispensing valve 16 is opened the liquid will flow down through the valve column, elbow 18 and pipe 15 to the hose 17, until the level of the liquid is flush with the upper edge of the top valve 20; thereby dispensing one gallon. Each of the valves 20 measues one gallon of the remaining nine gallons.

For raising the valves individually and collectively I provide a lifter comprising a vertical rod 23 depending through the cap 13 and extending down the center of the column. This rod is supported by a horizontal arm 24 in which the rod is fastened by a set screw 25. The arm is carried on the upper end of an upright staff 26. In each valve 20 is fastened a C-shaped bracket 27 having eyes 28 on the ends of its horizontal arms through which the rod 23 slides. On the rod just above the top valve 20 is fastened a collar 29 by means of a set screw 30. A yoke 31 having eyes at each end receiving the rod has its upper end carried by the collar; while its lower end is disposed below the top arm of the bracket of the top valve.

It will be seen that when the rod is lifted the yoke 31 will be elevated. After the yoke has been lifted a short distance it will engage the bracket 27 and continued lifting movement will elevate the top valve 20, which will thus be separated from the next lowest valve. Other yokes 32 mounted on the rod 23 normally rest upon the eye 28 of the lower arm of each valve and have their lower ends spaced below the upper eye of each bracket. It will be seen that when one valve has been lifted to provide an opening between it and the next lowest valve, continued movement will lift the next valve through the agency of the yoke. It is pointed out that the column may be opened at any measuring level by lifting the valves above said level.

In order to relieve the operator from gauging or guessing I provide a setting device for dispensing the exact number of gallons desired. This device comprises a vertical cylinder 33 immovably suspended from a hanger 34 in the pedestal. The hanger is fastened on the lower end of a tube 35 having its upper end fastened in the base 11. The cylinder has a vertical slot 36 in one side and is exposed through an opening 37 in the pedestal.

Within the cylinder 33 is a spindle 38 having a collar 39 on its upper end which is rotatably confined in the tube 35. A handle 40 fastened on the lower end of the spindle engages the bottom of the cylinder. By rotating the handle the spindle may be turned. On the spindle I mount a plurality of stop collars 41 each fastened by a set screw 42 (Fig. 7) and each having a radial lug 43.

The staff 26 has a finger hold 44 at its lower end and is provided with a lateral finger 45 extending through the slot 37 so as to rest upon one of the lugs 43. The parts are positioned so that when the staff 26 is lifted and then lowered so that the finger 45 rests upon a lug, the valves 20 will be lifted according to the position of the lug. Each lug is consecutively numbered beginning with "2" at the lowest lug and ending with "10" at the top lug. These lugs are arranged in a spiral and the numbers are visible through the slot 36.

In operating the dispenser the cylinder 10 is filled in the usual manner and the liquid drained back to the level of the overflow pipe 14. This fills the valve column, elbow 18, pipe 15 and the valve 16 to its gate. If one gallon only is desired it is merely necessary to open the dispensing valve 16 which will drain the liquid down to the level of the upper edge 21 of the top valve 20. However should four gallons be desired the operator grasps the finger hold 44 and lifts the staff 26 and with his other hand rotates the handle 40 until the lug bearing the numeral "4" is visible through the slot 36. The operator then lowers the staff until the finger 45 rests upon said lug.

When the staff is lifted a number of valves will be elevated by reason of the yokes 31 and 32 successively engaging the eyes 28 of the brackets 27 and successively lifting the valves. However when the staff is lowered and rests upon the lug all the valves below the level to which the cylinder is to be drained will be lowered and closed. The operator then opens the valve 16 and dispenses four gallons of liquid.

Various changes in the size and shape of the different parts, as well as modifications and alterations may be made within the scope of the appended claims.

What I claim, is:

1. In a fluid dispenser, the combination with a measuring container and a discharge pipe leading from the container, of a tubular valve column composed of transverse separable sections communicating with said pipe, and a longitudinally movable member extending through said column and carrying means for successively engaging and separating said sections.

2. In a fluid dispenser, the combination with a measuring container and a dispensing pipe provided with a control valve leading from the container, of a tubular valve column composed of transverse separable sections communicating with said pipe, means extending into said column for selectively separating said sections, and means for setting said last named means at selected points for separating a predetermined number of valve sections.

3. In a fluid dispenser, the combination with a measuring container and a dispensing pipe provided with a control valve leading from the container, of a tubular valve column composed of transversely separable sections communicating with said pipe, said sections being directly mounted one upon the other and the joints therebetween including a reduced edge on one section and a flat contacting surface on the other section, and means extending into said column for selectively separating said valve sections at their joints.

4. In a fluid dispenser, the combination with a measuring container and a dispensing pipe provided with a control valve leading from the container, of a tubular valve column composed of transversely separable sections communicating with said pipe, said sections being directly mounted one upon the other and the joints therebetween including a reduced edge on one section and a flat contacting surface on the other section, and means extending into said column for selectively lifting one or a plurality of said sections and separating said sections at their joints.

5. In a fluid dispenser, the combination of a measuring container having a closed top, a dispensing valve connected with the bottom of the container, an overflow pipe in the container, a plurality of vertically disposed contacting tubular valves in the container and connected with the dispensing valve, means depending through the top of the container and into the valves for selectively lifting one or more of the valves for opening the same, and means outside of the container and connected with the lifting means at a point above the container top for setting said lifting means at indicated points for lifting a predetermined number of valves.

6. In a fluid dispenser, the combination of a measuring container having a closed top, a dispensing valve connected with the bottom of the container, an overflow pipe in the container, a plurality of vertically disposed contacting tubular valves in the container and connected with the dispensing valve, a lifting element depending into the valves, brackets carried by the valves and loosely engaging said lifting element, connections loose on said element connecting said brackets, means fixed on said element for connection with the uppermost bracket for lifting the same, and means for lifting said element.

7. In a fluid dispenser, the combination of a measuring container having a closed top, a dispensing valve connected with the bottom of the container, an overflow pipe in the container, a plurality of vertically disposed contacting tubular valves in the container and connected with the dispensing valve, a lifting rod extending down through said valves, brackets carried by the valves therein and loosely engaging the rod, yokes loose on the rod supported for engagement with the brackets, and a collar on the rod supporting the upper yoke, and means for lifting the rod.

8. In a fluid dispenser, the combination with a measuring container and a discharge pipe, of a measuring and conducting valve column communicating with said pipe and composed of transverse separable sections, a rod extending into the valve column, lifting elements secured to each valve section, loose connections mounted on the rod and extending from one lifting element to another permitting each section to be lifted a limited distance before lifting the next lowermost section, and a connection between the rod and the top valve section for lifting the latter.

9. In a fluid dispenser, the combination with a measuring container and a dispensing pipe provided with a control valve leading from the container, of a measuring and conducting valve column communicating with said dispensing pipe and composed of transverse separable sections, a rod extending into the valve column, lifting elements secured to each valve section, loose connections mounted on the rod and extending from one lifting element to another permitting each section to be lifted a limited distance before lifting the next lowermost section, a connection between the rod and the top valve section for lifting the latter, and means for actuating the rod to separate the valve sections.

10. In a fluid dispenser, the combination with a measuring container and a dispensing valve connected therewith, of a plurality of superimposed tubular valves in said container, a rod depending from the top of said container and connected interiorly with the valves for successively lifting the same, a vertical staff outside the container connected with the rod, a projection carried by the staff, a rotatable member, and a plurality of adjustable collars mounted on the member and having lugs spaced spirally for adjustment into the path of the finger of the staff.

11. As a sub-combination in a fluid dispenser, a dispensing valve column comprising a plurality of superimposed tubular valves having reduced upper edges and flat engaging edges resting upon said reduced edges.

12. As a sub-combination in a fluid dispenser, a dispensing valve column comprising a plurality of superimposed tubular valves having reduced upper edges and flat engaging edges resting upon said reduced edges, a bracket in each valve, and lifting yokes extending between the brackets.

13. In a fluid dispenser, the combination of a measuring container, a discharge pipe leading therefrom, a column comprising a plurality of vertically disposed contact tubular valves within the container and connected with the discharge pipe, means within the container for selectively lifting one or more of said valves for opening the same, and means for setting the lifting means at selected points for separating a predetermined number of valve sections.

14. In a fluid dispenser, the combination of a measuring container, a discharge pipe leading therefrom, a tubular valve column composed of transversely separable superposed sections communicating with said pipe, said sections having joints therebetween including a reduced edge on one section and a flat contacting surface on the other section, and means extending into said column for selectively separating said valve sections at their joints.

15. In a fluid dispenser, the combination of a measuring container having a closed top and a dispensing valve, a discharge pipe leading from the container, a plurality of vertically disposed contacting tubular valves in the container and connected with said pipe, means depending through the top of the container and into the valves for selectively lifting one or more of the valves for opening the same, and means outside of the container and connected with the lifting means at a point above the container top for setting said lifting means at indicated points for lifting a predetermined number of valves.

16. In a fluid dispenser, the combination of a measuring container having a dispensing valve, a discharge pipe leading from the container, a plurality of vertically disposed contacting tubular valves in the container and connected with said pipe, a lifting element depending into the valves, brackets carried by the valves and loosely engaging said lifting element, connections loose on said element connecting said brackets, means fixed on said element for connection with the uppermost bracket for lifting the same, and means for lifting said element.

17. A liquid dispensing device having in combination a container adapted to hold a quantity of liquid, an outlet, a sectional conduit extending vertically upward through said liquid and communicating at its lower end with said outlet and means for separating a predetermined number of said sections so as to cause a measured quantity of said liquid to flow through said outlet.

18. A liquid dispensing device having in combination a container adapted to hold a quantity of liquid, an outlet, a sectional conduit in said container communicating with said outlet, a rod slidably mounted within said conduit and provided with means for separating the sections thereof upon longitudinal movement of said rod to deliver liquid to said outlet and means for moving said rod.

19. A liquid dispensing device having in combination a container adapted to hold a quantity of liquid, an outlet, a sectional conduit in said container communicating with said outlet, a rod slidably mounted within said conduit and provided with means for successively separating the sections of said conduit to deliver liquid to said outlet and means for moving said rod a predetermined amount to separate a predetermined number of sections.

20. A liquid dispensing device having in combination a container adapted to hold a quantity of liquid, an outlet communicating with the bottom of said container, a conduit communicating with said outlet and including a plurality of superimposed sections forming outlet orifices at different heights and means for raising any desired number of said sections so as to open a selected number of said orifices to permit the delivery of a predetermined quantity of said liquid through said outlet.

21. A liquid dispensing device having in combination a container adapted to hold a quantity of liquid, an outlet communicating with the bottom of said container, a conduit associated with said outlet and extending vertically upward through said liquid and formed by a plurality of superimposed sleeves, a lift rod extending axially through said sleeves and provided with means for progressively raising successive sleeves of said conduit and means for operating said rod.

22. A liquid dispensing apparatus having in combination a container adapted to hold a quantity of liquid, an outlet, a conduit communicating with said outlet and extending upwardly through said liquid and including separable sections forming outlet orifices at different heights in said liquid and mechanism for shifting said sections so as to permit the simultaneous flow of liquid through a predetermined number of said orifices to said outlet.

In testimony whereof I affix my signature.

ROSS E. RISSER.